United States Patent
Park et al.

(10) Patent No.: US 8,942,279 B2
(45) Date of Patent: Jan. 27, 2015

(54) APPARATUS AND METHOD FOR TRANSMITTING/RECEIVING DATA IN DUAL MODE TERMINAL

(75) Inventors: Jeong-Hoon Park, Suwon-si (KR); Sung-Wook Park, Seongnam-si (KR); Jai-Ho Lee, Anyang-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 106 days.

(21) Appl. No.: 13/392,507

(22) PCT Filed: Aug. 20, 2010

(86) PCT No.: PCT/KR2010/005528
§ 371 (c)(1), (2), (4) Date: Feb. 24, 2012

(87) PCT Pub. No.: WO2011/025186
PCT Pub. Date: Mar. 3, 2011

(65) Prior Publication Data
US 2012/0157014 A1 Jun. 21, 2012

(30) Foreign Application Priority Data
Aug. 24, 2009 (KR) .......... 10-2009-0077994

(51) Int. Cl.
*H04L 5/16* (2006.01)
*H04W 48/18* (2009.01)
*H04W 88/06* (2009.01)

(52) U.S. Cl.
CPC .............. *H04W 48/18* (2013.01); *H04W 88/06* (2013.01)
USPC ........................................... 375/226

(58) Field of Classification Search
USPC .......... 375/222, 259, 224; 370/252, 338, 401; 455/422.1, 552.1
See application file for complete search history.

(56) References Cited

U.S. PATENT DOCUMENTS

| 7,996,007 B2 * | 8/2011 | Bantukul ...................... 455/433 |
| 2005/0192048 A1 | 9/2005 | Bridgelall |
| 2008/0084854 A1 | 4/2008 | Feder et al. |
| 2009/0186608 A1 * | 7/2009 | Lee et al. ...................... 455/416 |

FOREIGN PATENT DOCUMENTS

| KR | 10-2005-0074773 | 7/2005 |
| KR | 10-2005-0082821 | 8/2005 |

OTHER PUBLICATIONS

International Searching Report dated May 23, 2011 in connection with International Patent Application No. PCT/KR2010/005528.
Written Opinion of International Searching Authority dated May 23, 2011 in connection with International Patent Application No. PCT/KR2010/005528.

* cited by examiner

*Primary Examiner* — Khai Tran

(57) ABSTRACT

An apparatus and a method for transmitting/receiving data in a dual mode terminal having a host modem and a slave modem are provided. In the method, when an external apparatus generates data, the host modem receives the generated data. The host modem determines a destination of the received data. The host modem forwards the received data to the determined destination.

20 Claims, 7 Drawing Sheets

A

B

APPARATUS AND METHOD FOR TRANSMITTING/RECEIVING DATA IN DUAL MODE TERMINAL

CROSS-REFERENCE TO RELATED APPLICATION(S)

The present application claims priority under 35 U.S.C. §365 to International Patent Application No. PCT/KR2010/005528 filed Aug. 20, 2010, entitled "APPARATUS AND METHOD FOR TRANSMUTING/ RECEIVING DATA IN DUAL MODE TERMINAL". International Patent Application No. PCT/KR2010/005528 claims priority under 35 U.S.C. §365 and/or 35 U.S.C. §119(a) to Korean Patent Application No. 10-2009-0077994 filed Aug. 24, 2009, and which are incorporated herein by reference into the present disclosure as if fully set forth herein.

TECHNICAL FIELD

The present invention relates to an apparatus and a method for transmitting/receiving data in a dual mode terminal. More particularly, the present invention relates to a dual mode terminal that can be realized in various types while removing a manufacturing cost raising factor and maintaining data continuity, and a method for effectively operating the terminal.

BACKGROUND ART

As distribution and use of a mobile terminal increase, a terminal that provides various functions is under development. Recently, a dual mode (or a dual standby mode) terminal that can use two wireless communication networks is brought to the market. The dual mode terminal can be used in an area where different networks are mixed or when a user roams into a network of a different service provider.

A general exclusive terminal that supports one wireless communication system can perform communication in only a service area of a relevant wireless communication system. In contrast, a dual mode terminal, for example, a dual mode terminal that supports a Code Division Multiple Access (CDMA) system and a Global System for Mobile Communications (GSM) can perform communication in a CDMA service area and a GSM service area, so that its utility is high.

The conventional dual mode terminal connects a Universal Serial Bus (USB) interface of each modem to a hub or a switch to perform communication with an external apparatus (ex. Personal Computer (PC)).

FIGS. 1A and 1B are block diagrams illustrating a dual mode terminal according to the conventional art.

First, FIG. 1A illustrates a dual mode terminal 100 where respective modems 102 and 104 are connected to a hub 106 to perform communication with a PC 110. The dual mode terminal 100 having the above construction requires a part called a 'hub' additionally, which causes a current consumption increase and a manufacturing cost raise to act as a factor that deteriorates competitiveness. In addition, since the dual mode terminal 100 having the above construction cannot use a different connection method except the USB, different methods such as Personal Computer Memory Card International Association (PCMCIA), Secure Digital Input Output (SDIO), Peripheral Component Interconnect (PCI) express, etc. is not applicable.

Next, FIG. 1B illustrates a dual mode terminal 100 in which respective modems 102 and 104 are connected to a switch 108 to perform communication with a PC 110. The dual mode terminal 100 having the above construction requires a switch device additionally, which causes a manufacturing cost raise, and cannot maintain data continuity between the two modems 102 and 104. That is, the modem 2 104 cannot continuously receive a data service that has been provided by the modem 1 102.

In addition, in the structures of FIGS. 1A and 1B, the PC 110 controls not only generation and processing of data, but also data transmission/reception of the modems 102 and 104 inside the dual mode terminal 100. That is, the PC 110 selects one modem to be connected and performs signaling with the selected modem to transmit/receive data. Accordingly, a large amount of signaling is required between the PC 110 and the dual mode terminal 100, and a delay in data transmission/reception may occur.

Therefore, a dual mode terminal for solving the above-described problems and a technique for effectively operating the terminal are required.

DISCLOSURE OF INVENTION

Solution to Problem

An aspect of the present invention is to address at least the above-mentioned problems and/or disadvantages and to provide at least the advantages described below. Accordingly, an aspect of the present invention is to provide an apparatus and a method for transmitting/receiving data in a dual mode terminal.

Another aspect of the present invention is to provide a dual mode terminal that can be realized in various types while removing a manufacturing cost raising factor and maintaining data continuity, and a method for effectively operating the terminal.

Still another aspect of the present invention is to provide an apparatus and a method in which a slave modem and a host modem are connected in a subordinate connection structure inside a dual mode terminal, and the host modem controls data transmission/reception between the slave modem, the host modem, and an external apparatus.

In accordance with an aspect of the present invention, a method for transmitting/receiving data in a dual mode terminal having a host modem and a slave modem is provided. The method includes, when an external apparatus generates data, receiving the generated data at the host modem, determining, at the host modem, a destination of the received data, and forwarding, at the host modem, the received data to the determined destination.

In accordance with another aspect of the present invention, a method for transmitting/receiving data in a dual mode terminal having a host modem and a slave modem is provided. The method includes generating data at the slave modem, receiving the generated data at the host modem, determining, at the host modem, a destination of the received data, and forwarding, at the host modem, the received data to the determined destination.

In accordance with still another aspect of the present invention, an apparatus for transmitting/receiving data in a dual mode terminal having a host modem and a slave modem is provided. The apparatus includes a communication unit inside the host modem for, when an external apparatus generates data, receiving the generated data, and a dual mode controller inside the host modem, for determining a destination of the received data and forwarding the received data to the determined destination.

In accordance with further another aspect of the present invention, an apparatus for transmitting/receiving data in a dual mode terminal having a host modem and a slave modem is provided. The apparatus includes the slave modem for generating data, a connection memory inside the host modem, for receiving the generated data, and a dual mode controller inside the host modem, for determining a destination of the received data and forwarding the received data to the determined destination.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF DRAWINGS

The above and other aspects, features and advantages of certain exemplary embodiments of the present invention will be more apparent from the following description taken in conjunction with the accompanying drawings in which.

Throughout the drawings, like reference numerals will be understood to refer to like parts, components and structures.

BEST MODE FOR CARRYING OUT THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

Exemplary embodiments of the present invention provide a data transmission/reception technique of a dual mode terminal. More particularly, exemplary embodiments of the present invention provide a dual mode terminal that can be realized in various types while removing a manufacturing cost raising factor and maintaining data continuity, and a method for effectively operating the terminal.

Though a dual mode terminal including two modems is exemplarily described in the following, it is extensible to a multi-mode terminal including a plurality of modems. In addition, though the following description is made using a PC as an external apparatus that performs communication with a dual mode terminal, the description is not limited thereto but is applicable to communication with various external apparatuses. In addition, a modem including a dual mode controller to control data transmission/reception between two modems and a PC is referred to as a 'host modem', and a modem forming a pair with the host modem in a dual mode terminal and operating under a control of the host modem is referred to as a 'slave modem'.

Figure 1:
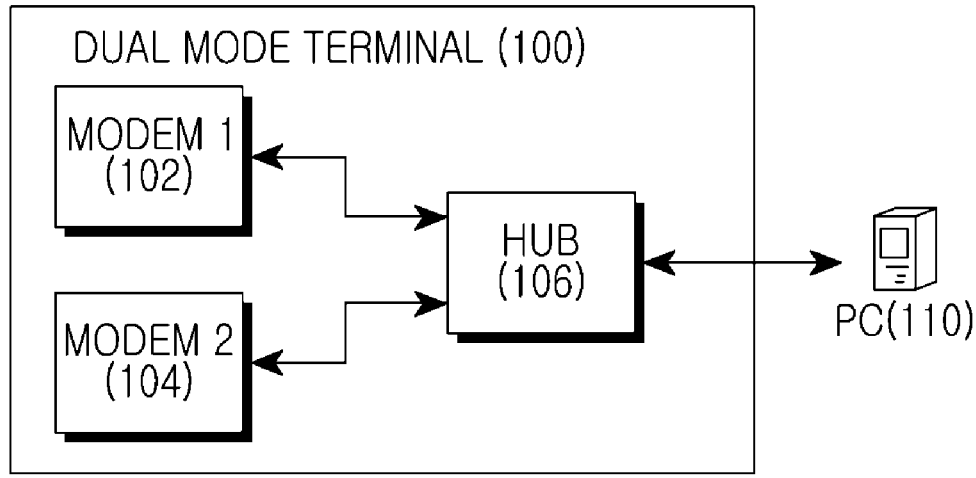
FIGS. 1A and 1B are block diagrams illustrating a dual mode terminal according to the conventional art.
Figure 1:
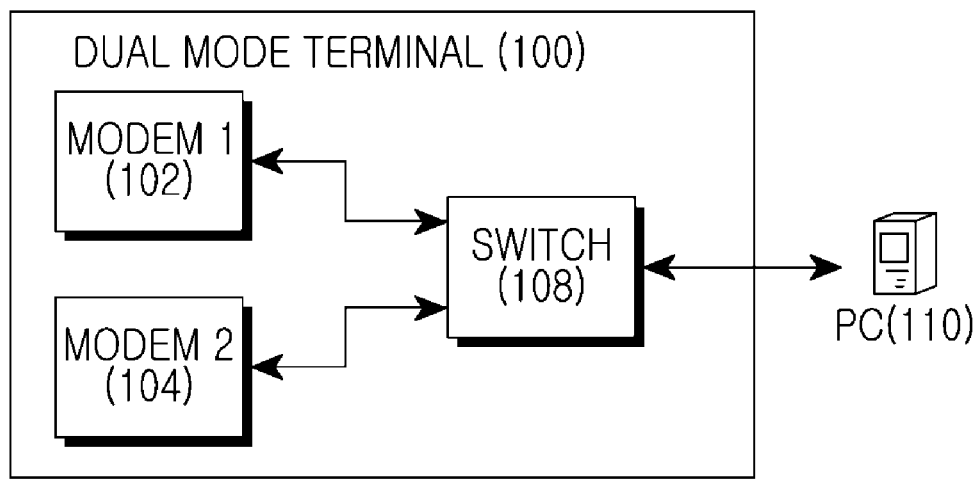
Figure 2:
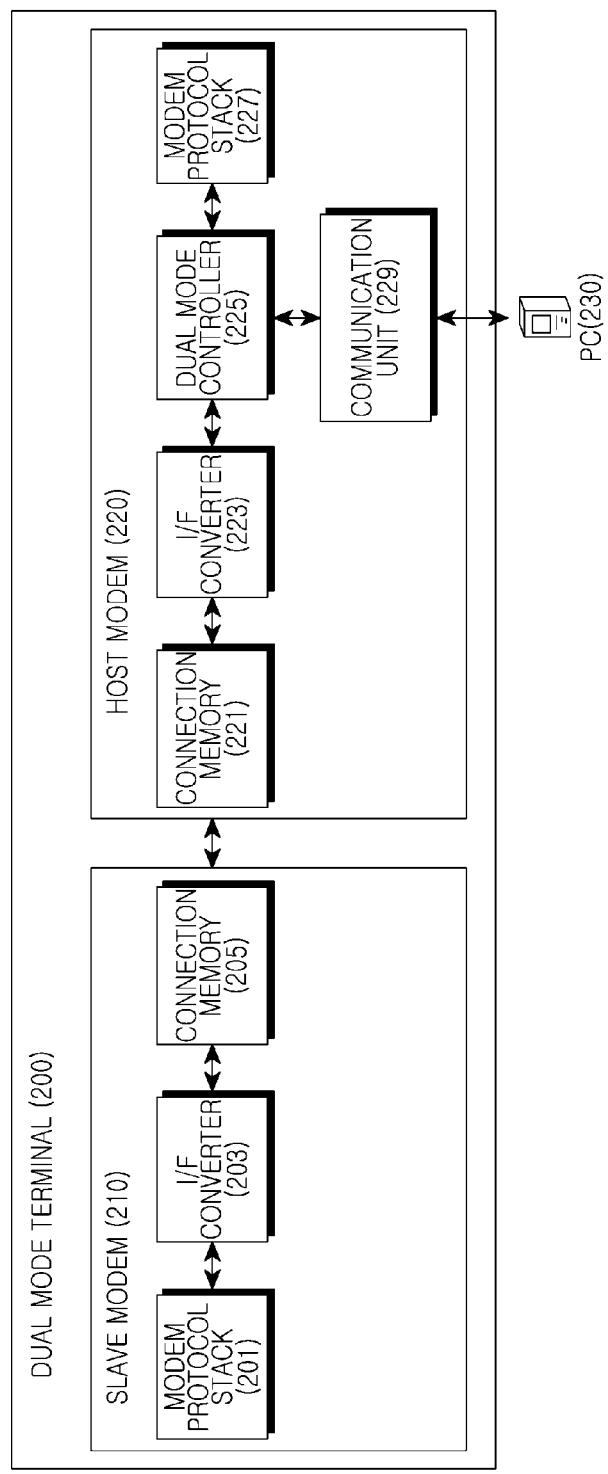
FIG. 2 is a block diagram illustrating a dual mode terminal according to an exemplary embodiment of the present invention.

FIG. 2 is a block diagram illustrating a dual mode terminal according to an exemplary embodiment of the present invention.

Referring to FIG. 2, a dual mode terminal 200 that supports a dual mode includes a slave modem 210 and a host modem 220. For example, in the case where the dual mode terminal 200 supports a CDMA mode and a GSM mode, modems that support respective modes are provided inside the dual mode terminal 200. One serves as a host modem 220 and the other serves as a slave modem 210. Here, the respective modems 210 and 220 may be a modem chip formed of a single chip or may be a Digital Signal Processor (DSP) inside the chip, and process a signal of a relevant mode transmitted/received via an antenna using a relevant processing module.

The slave modem 210 and the host modem 220 are connected through a subordinate structure, and respective modems 210 and 220 may be connected using an interface suitable for a data rate that the host modem 220 desires to achieve. The slave modem 210 may perform communication with an external apparatus (ex. PC) 230 under control of the host modem 220. That is, the host modem 220 performs direct communication with the external apparatus 230, and the slave modem 210 performs indirect communication with the external apparatus 230 via the host modem 220.

Specifically, the slave modem 210 includes a modem protocol stack 201, an Interface (I/F) converter 203, and a connection memory 205.

The modem protocol stack 201 is defined as a series of layers for communication, generates transmission data, and processes reception data. That is, the modem protocol stack 201 generates data to be transferred to the PC 230 or the host modem 220 to provide the same to the I/F converter 203, and processes data received from the PC 230 or the host modem 220 via the I/F converter 203.

The I/F converter 203 converts data from the modem protocol stack 201 into data used for the connection memory 205 and converts data from the connection memory 205 into data used for the modem protocol stack 201 so that an interface between the modem protocol stack 201 and the connection memory 205 may be swiftly formed.

The connection memory 205 serves as a medium for connecting the slave modem 210 with the host modem 220. The connection memory 205 buffers data from the I/F converter 203 of the slave modem 210 to provide the same to the host modem 220, and buffers data from the host modem 220 to provide the same to the I/F converter 203. The connection memory 205 may be realized using a Dual Ported Random Access Memory (DPRAM) or One dynamic RAM (One-DRAM), etc.

Next, the host modem 220 includes a connection memory 221, an I/F converter 223, a dual mode controller 225, a modem protocol stack 227, and a communication unit 229.

The connection memory 221 serves as a medium for connecting the host modem 220 with the slave modem 210. The connection memory 221 buffers data from the I/F converter 223 of the host modem 220 to provide the same to the slave modem 210, and buffers data from the slave modem 210 to provide the same to the I/F converter 223. The connection memory 221 may be realized using a DPRAM or OneDRAM, etc.

The I/F converter 223 converts data from the dual mode controller 225 into data used for the connection memory 221 and converts data from the connection memory 221 into data used for the dual mode controller 225 so that an interface between the dual mode controller 225 and the connection memory 221 may be swiftly formed.

The dual mode controller 225 controls data transmission/reception between the host modem 220, the slave modem 210, and the PC 230. That is, the dual mode controller 225 forwards transmitted/received data depending on the type of the data. As described above, since the dual mode controller 225 controls transmission/reception of data between the host modem 220, the slave modem 210, and the PC 230, the PC 230 performs only generation and processing of data, so that signaling between the PC 230 and the dual mode terminal reduces compared with the conventional art.

In addition, the dual mode controller 225 periodically measures reception signal strength received via each modem to set or change a state of each modem to an activation state or a sleep state, or maintain the state of each modem depending on a channel environment. A mode of the dual mode terminal 200 is changed depending on the state change of the modem. The dual mode controller 225 may maintain data continuity by controlling a handover between the host modem and the slave modem as described above.

The modem protocol stack 227 is defined as a series of layers for communication, generates transmission data, and processes reception data. That is, the modem protocol stack 227 generates data to be transferred to the PC 230 or the slave modem 210 to provide the same to the dual mode controller 225, and processes data received from the PC 230 or the slave modem 210 via the dual mode controller 225.

The communication unit 229 is directly connected with the external apparatus 230 to process data communication between the dual mode terminal 200 and the external apparatus 230. That is, the communication unit 229 provides data from the dual mode controller 225 to the PC 230, and provides data from the PC 230 to the dual mode controller 225. The communication unit 229 may use a USB communication method, and may use different connection methods (ex. PCMCIA, SDIO, and PCI express).

Figure 3:
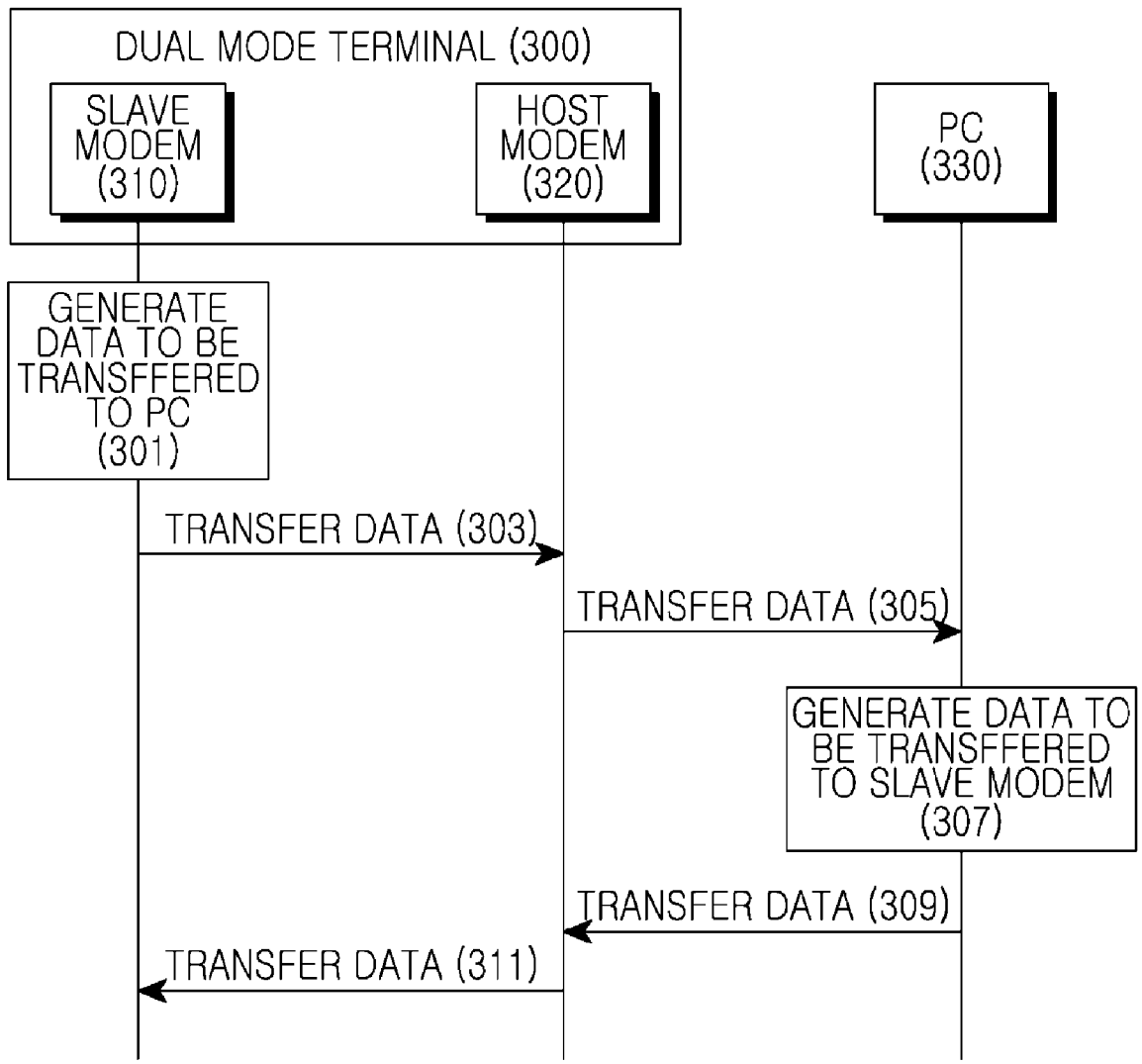
FIG. 3 is a diagram illustrating a signal flow of a method for transmitting/receiving data in a slave modem inside a dual mode terminal according to an exemplary embodiment of the present invention.

FIG. 3 is a diagram illustrating a signal flow of a method for transmitting/receiving data in a slave modem inside a dual mode terminal according to an exemplary embodiment of the present invention.

Referring to FIG. 3, in the case of data transmission, when a slave modem 310 inside a dual mode terminal 300 generates data to be transferred to a PC 330 in step 301, the slave modem 310 transfers the generated data to a connected host modem 320 in step 303. At this point, the host modem 320 is directly connected with the PC 330 via a USB connection method to transfer the data from the slave modem 310 to the PC 330 in step 305.

In contrast, in the case of data reception, when the PC 330 generates data to be transferred to the slave modem 310 in step 307, the PC 330 transfers the generated data to the host modem 320 inside the dual mode terminal 300 that is directly connected via the USB connection method in step 309. At this point, the host modem 320 transfers the data to the slave modem 310 in step 311.

Figure 4:
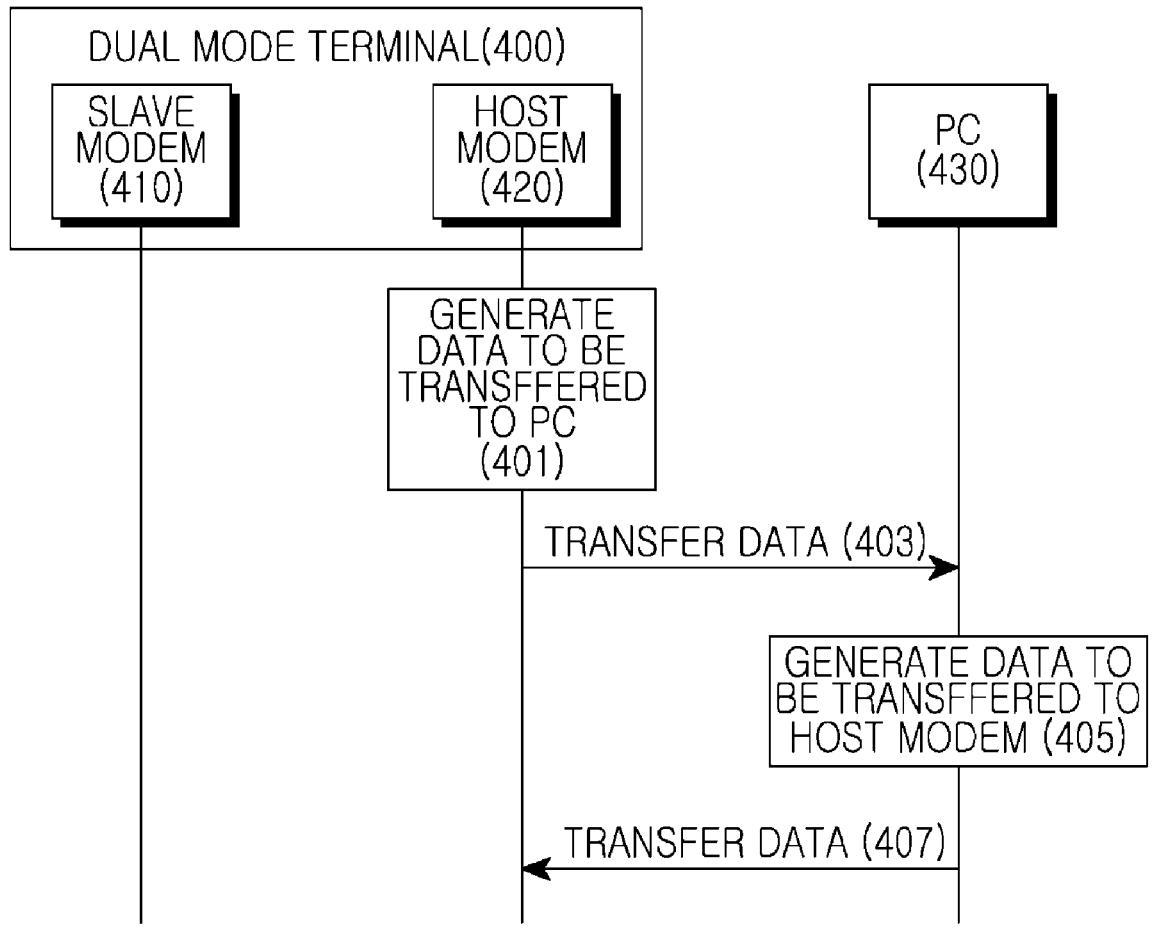
FIG. 4 is a diagram illustrating a signal flow of a method for transmitting/receiving data in a host modem inside a dual mode terminal according to an exemplary embodiment of the present invention.

FIG. 4 is a diagram illustrating a signal flow of a method for transmitting/receiving data in a host modem inside a dual mode terminal according to an exemplary embodiment of the present invention.

Referring to FIG. 4, in the case of data transmission, when a host modem 420 inside a dual mode terminal 400 generates data to be transferred to a PC 430 in step 401, the host modem 420 is directly connected with the PC 430 via a USB connection method to directly transfer the generated data to the PC 430 in step 403.

In contrast, in the case of data reception, when the PC 430 generates data to be transferred to the host modem 420 inside the dual mode terminal 400 in step 405, the PC 430 directly transfers the generated data to the host modem 420 directly connected via the USB connection method in step 407.

Figure 5:
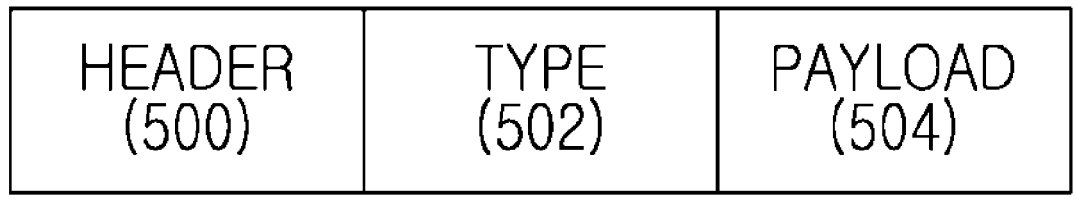
FIG. 5 is a diagram illustrating a data format transmitted/received in a dual mode terminal according to an exemplary embodiment of the present invention.

FIG. 5 is a diagram illustrating a data format transmitted/received in a dual mode terminal according to an exemplary embodiment of the present invention.

Referring to FIG. 5, data transmitted/received between a host modem, a slave modem inside a dual mode terminal, and a PC has a structure in which a header field 500 and a type field 502 are added in front of a payload field 504.

According to an exemplary embodiment of the present invention, the type field 502 indicates type information of relevant data. Here, the type information of the data includes information as to whether the relevant data is user data or control data, and information regarding the type of control data when the relevant data is the control data. Therefore, the dual mode controller inside the host modem, that controls data transmission/reception between the host modem, the slave modem, and the PC extracts type information from the type field 502 of transmitted/received data, and may forward the relevant data to the host modem or the slave modem or PC using the extracted type information.

Figure 6:
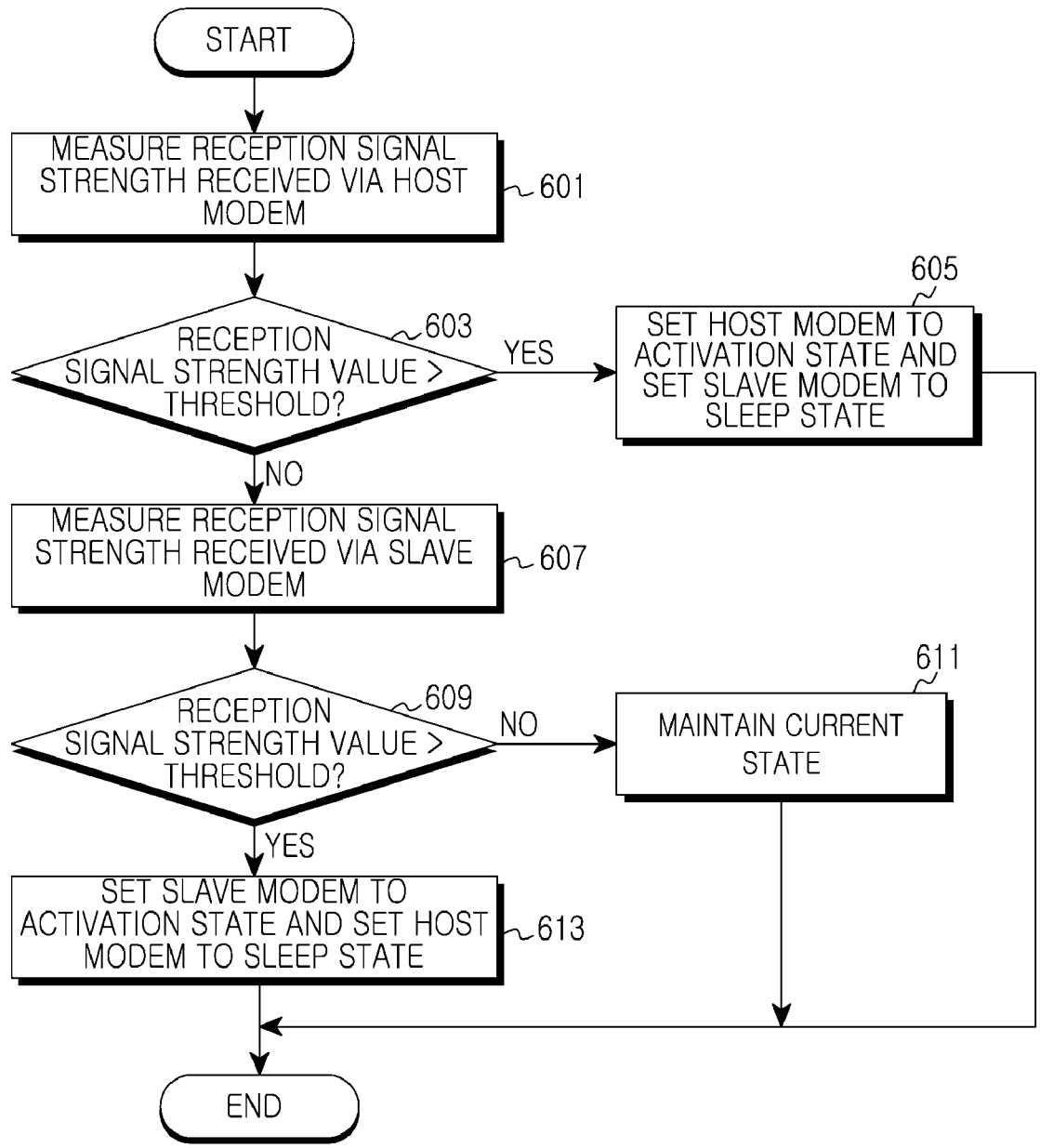
FIG. 6 is a flowchart illustrating a method for setting a state of each modem in a dual mode terminal according to an exemplary embodiment of the present invention.

FIG. 6 is a flowchart illustrating a method for setting a state of each modem in a dual mode terminal according to an exemplary embodiment of the present invention.

Referring to FIG. 6, a dual mode terminal measures strength of a reception signal received via a host modem in step 601, and determines whether a reception signal strength value obtained through the reception signal strength measurement by the host modem is greater than a threshold in step 603.

When the reception signal strength value obtained through the measurement is greater than the threshold in step 603, the dual mode terminal determines a modem that advantageously operates under a current channel state is the host modem, sets the host modem to an activation state, and sets a slave modem to a sleep state in step 605.

In contrast, when the reception signal strength value obtained through the measurement is not greater than the threshold in step 603, the dual mode terminal measures strength of a reception signal received via the slave modem in step 607, and determines whether reception signal strength value obtained through reception signal strength measurement by the slave modem is greater than the threshold in step 609.

When the reception signal strength value obtained through the measurement is greater than the threshold in step 609, the dual mode terminal determines a modem that advantageously operates under a current channel state is the slave modem, sets the slave modem to an activation state, and sets the host modem to a sleep state in step 613.

In contrast, when the reception signal strength value obtained through the measurement is not greater than the threshold in step 609, the dual mode terminal maintains a state to which the host modem and the slave modem are currently set in step 611.

After that, the dual mode terminal ends the algorithm according to an exemplary embodiment of the present invention.

According to an exemplary embodiment of the present invention, a modem that advantageously operates under a current channel state is activated and the other modem forming a pair is set to a sleep state, so that the dual mode terminal is allowed to use one mode. Therefore, to change a mode of the dual mode terminal, a user needs to set a modem of a previous mode to a sleep state and allows a modem of a mode to be changed to get out of a sleep state and to be activated.

Here, the sleep denotes that a Radio Frequency (RF) portion and most of functions are inactivated with power of a modem not turned off. Consequently, a modem in a sleep state does not have an influence on the other modem and power is applied to the modem itself. Therefore, a modem in a sleep state is immediately activated and a mode change is possible without booting and initialization processes of a terminal, so that a time taken for mode change is reduced to 2 to 3 seconds.

Figure 7:
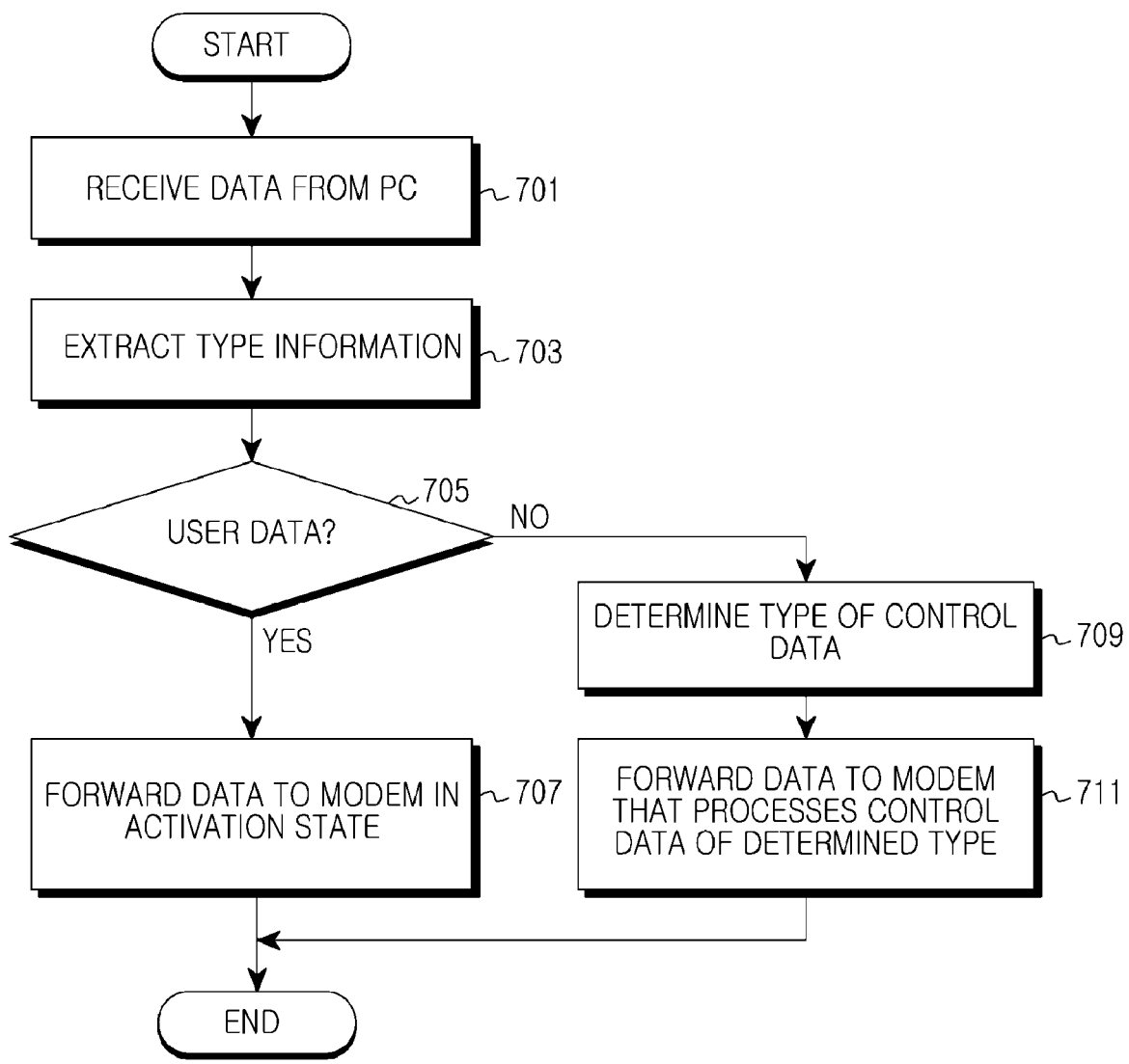
FIG. 7 is a flowchart illustrating a method for forwarding, at a host modem, data received from a PC depending on the type of the data in a dual mode terminal according to an exemplary embodiment of the present invention.

FIG. 7 is a flowchart illustrating a method for forwarding, at a host modem, data received from a PC depending on the type of the data in a dual mode terminal according to an exemplary embodiment of the present invention.

Referring to FIG. 7, a host modem receives data from a PC in step 701, and extracts type information from a type field of the received data in step 703. Here, the type information of the data includes information as to whether the relevant data is user data or control data, and information regarding the type of control data when the relevant data is the control data.

The host modem determines whether the data is user data or control data based on the extracted type information in step 705.

When the data is user data in step 705, the host modem forwards the data to a modem that is currently set to an activation state in step 707. That is, when a modem in an activation state is the host modem, the host modem forwards user data from a PC to a modem protocol stack inside the host modem. When a modem in an activation state is a slave modem, the host modem forwards the user data form the PC to a modem protocol stack inside the slave modem. Here, when a modem in an activation state is the slave modem, the user data from the PC is forwarded to the modem protocol stack of the slave modem by way of a connection memory. Alternatively, in the case of an initial stage of communication, the host modem may forward the data to a default modem.

In contrast, when the data is control data in step 705, the host modem determines the type of the control data in step 709, and forwards the data to a modem that processes the control data of the determined type in step 711. As described above, destination of control data is determined depending on its type.

After that, the host modem ends the algorithm according to an exemplary embodiment of the present invention.

Figure 8:
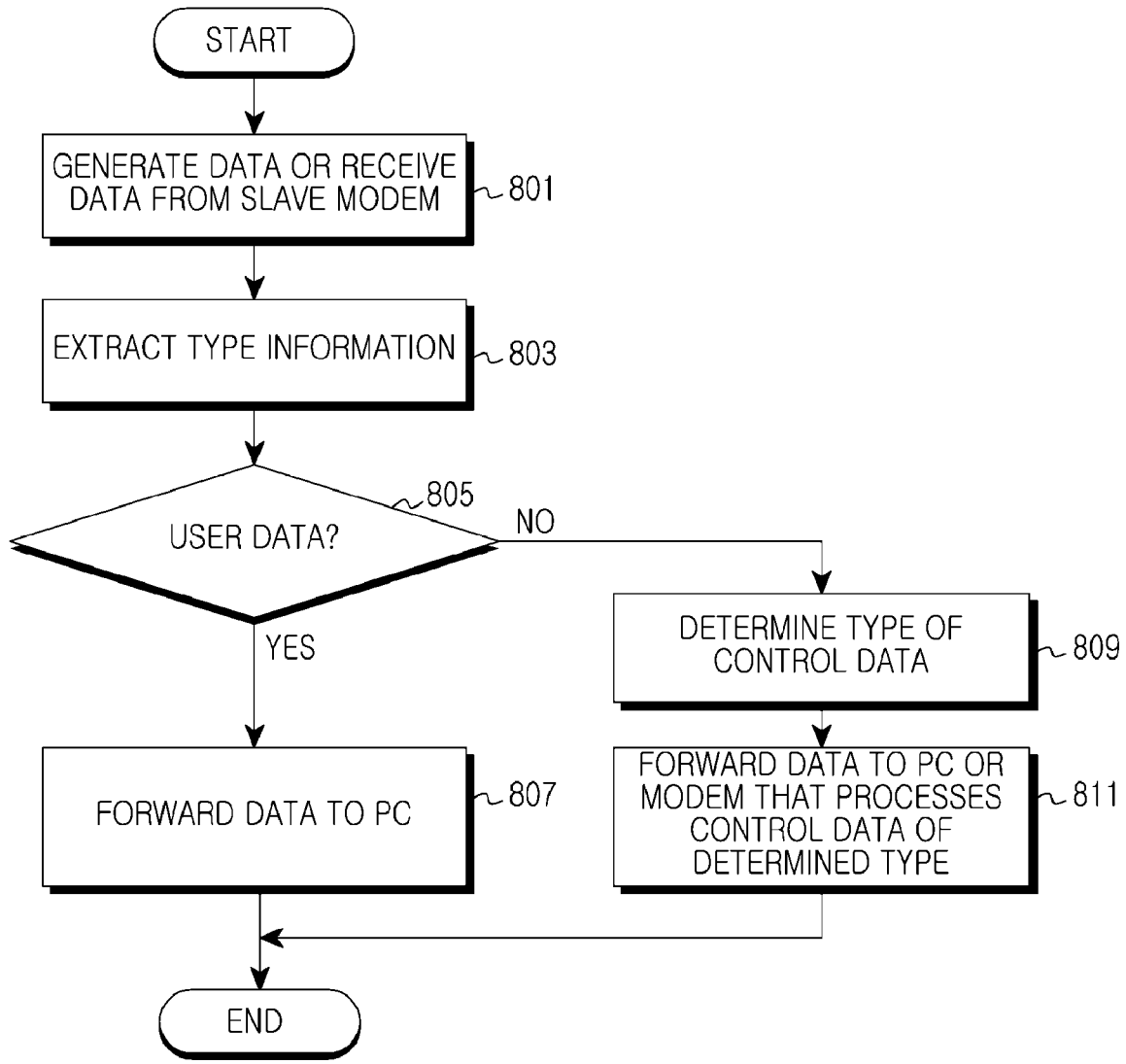
FIG. 8 is a flowchart illustrating a method for forwarding, at a host modem, data generated from the host modem itself or received from a slave modem depending on the type of the data in a dual mode terminal according to an exemplary embodiment of the present invention.

FIG. 8 is a flowchart illustrating a method for forwarding, at a host modem, data generated from the host modem itself or received from a slave modem depending on the type of the data in a dual mode terminal according to an exemplary embodiment of the present invention.

Referring to FIG. 8, the host modem generates data in itself or receives data from a slave modem in step 801.

The host modem extracts type information from a type field of the data generated by the host modem itself or received from the slave modem in step 803. Here, the type information of the data includes information as to whether the relevant data is user data or control data, and information regarding the type of control data when the relevant data is the control data.

The host modem determines whether the data is user data or control data based on the extracted type information in step 805.

When the data is the user data in step 805, the host modem forwards the data generated by the host modem itself or received from the slave modem to a PC in step 807. That is, the user data generated inside the dual mode terminal is forwarded to the PC unconditionally. Here, as user data generated inside the dual mode terminal, data transmitted from a base station to the dual mode terminal is exemplarily described. When the host modem is in an activation state, data transmitted from the base station to the dual mode terminal is forwarded to the PC via a communication unit inside the host modem. In addition, when the slave modem is in an activation state, data transmitted from the base station to the dual mode terminal is forwarded from the slave modem to the PC via the communication unit inside the host modem by way of a connection memory.

In contrast, when the data is control data in step 805, the host modem determines the type of the control data in step 809, and forwards the data to the PC or a modem that processes the control data of the determined type in step 811. For example, handover and measurement related data are forwarded to a dual mode controller inside the host modem. As described above, destination of control data is determined depending on its type.

After that, the host modem ends the algorithm according to an exemplary embodiment of the present invention.

As described above, exemplary embodiments of the present invention provide a dual mode terminal where a slave modem and a host modem are connected in a subordinate connection structure inside the dual mode terminal, and the host modem controls data transmission/reception between the slave modem, the host modem, and an external apparatus, and a method for effectively operating the dual mode terminal. Therefore, exemplary embodiments of the present invention may realize various types of terminals while removing a manufacturing cost raising factor and maintaining data continuity. In addition, as the host modem controls data transmission/reception between modems, and between a modem and an external apparatus, the external apparatus performs only generation and processing of data, so that signaling between the external apparatus and the dual mode terminal reduces compared with the conventional art.

Although the invention has been shown and described with reference to certain exemplary embodiments thereof, it will be understood by those skilled in the art that various changes in form and details may be made therein without departing from the spirit and scope of the invention as defined by the appended claims and their equivalents. Therefore, the scope of the present invention should not be limited to the above-described embodiments but should be determined by not only the appended claims but also the equivalents thereof.

The invention claimed is:

1. A method for receiving data in a dual mode terminal having a host modem and a slave modem, the method comprising:
   receiving, at the host modem, data transmitted from an external apparatus;
   determining, at the host modem, a destination of the received data, wherein the host modem determines the destination of the received data depending on a type information of the received data; and
   forwarding, at the host modem, the received data to the determined destination,
   wherein the slave modem is configured to receive the received data via the host modem when the determined destination is the slave modem.

2. The method of claim 1, further comprising extracting, at the host modem, the type information from the received data.

3. The method of claim 1, wherein the type information comprises at least one of:
   information as to whether relevant data is user data or control data, and information regarding a type of control data.

4. The method of claim 3, wherein the determining of the destination of the received data comprises:
   when the received data is user data, determining, at the host modem, a modem in an activation state as the destination of the received data; and
   when the received data is control data, determining, at the host modem, a modem that processes control data of a relevant type as the destination of the received data depending on the type of the control data.

5. The method of claim 4, further comprising:
   measuring, at the host modem, strength of a reception signal received via the host modem;
   determining, at the host modem, whether a reception signal strength value obtained through the reception signal strength measurement by the host modem is greater than a threshold;
   when the reception signal strength value obtained through the reception signal strength measurement by the host modem is greater than the threshold, setting, at the host modem, the host modem to an activation state, and setting the slave modem to a sleep state;
   when the reception signal strength value obtained through the reception signal strength measurement by the host modem is not greater than the threshold, measuring, at the host modem, strength of a reception signal received via the slave modem;
   determining, at the host modem, whether a reception signal strength value obtained through the reception signal strength measurement by the slave modem is greater than the threshold;
   when the reception signal strength value obtained though the reception signal strength measurement by the slave modem is greater than the threshold, setting, at the host modem, the slave modem to an activation state, and setting the host modem to a sleep state; and
   when the reception signal strength value obtained through the reception signal strength measurement by the slave modem is not greater than the threshold, maintaining, at the host modem, a state to which the host modem and the slave modem are currently set.

6. The method of claim 4, further comprising:
   measuring, at the host modem, strength of a reception signal received via the host modem;
   determining, at the host modem, whether a reception signal strength value obtained through the reception signal strength measurement by the host modem is greater than a threshold;
   when the reception signal strength value obtained through the reception signal strength measurement by the host modem is greater than the threshold, setting, at the host modem, the host modem to an activation state, and setting the slave modem to a sleep state; and
   when the reception signal strength value obtained through the reception signal strength measurement by the host modem is not greater than the threshold, measuring, at the host modem, strength of a reception signal received via the slave modem.

7. The method of claim 4, further comprising:
   measuring, at the host modem, strength of a reception signal received via the slave modem;
   determining, at the host modem, whether a reception signal strength value obtained through the reception signal strength measurement by the slave modem is greater than the threshold;
   when the reception signal strength value obtained though the reception signal strength measurement by the slave modem is greater than the threshold, setting, at the host modem, the slave modem to an activation state, and setting the host modem to a sleep state; and
   when the reception signal strength value obtained through the reception signal strength measurement by the slave modem is not greater than the threshold, maintaining, at the host modem, a state to which the host modem and the slave modem are currently set.

8. A method for transmitting data in a dual mode terminal having a host modem and a slave modem, the method comprising:
   generating data at the slave modem;
   receiving, at the host modem, the generated data from the slave modem;
   determining, at the host modem, a destination of the received data, wherein the host modem determines the destination of the received data depending on a type information of the received data; and
   forwarding, at the host modem, the received data to the determined destination,
   wherein the slave modem is configured to transmit the generated data via the host modem to an external apparatus when the determined destination is the external apparatus.

9. The method of claim 8, further comprising extracting, at the host modem, the type information from the received data; and
   wherein the type information comprises at least one of:
      information as to whether relevant data is user data or control data, and information regarding a type of control data.

10. The method of claim 9, wherein the determining of the destination of the received data comprises:
    when the received data is user data, determining, at the host modem, the external apparatus as the destination of the received data; and
    when the received data is control data, determining, at the host modem, the external apparatus or a modem that processes control data of a relevant type as the destination of the received data depending on the type of the control data.

11. An apparatus for receiving data in a dual mode terminal having a host modem and a slave modem, the apparatus comprising:

a communication unit inside the host modem configured receive data transmitted from an external apparatus; and a dual mode controller inside the host modem configured to determine a destination of the received data and forward the received data to the determined destination, wherein the dual mode controller is configured to determine the destination of the received data depending on a type information of the received data, wherein the slave modem is configured to receive the received data via the host modem when the determined destination is the slave modem.

12. The apparatus of claim 11, wherein the dual mode controller inside the host modem is further configured to extract the type information from the received data.

13. The apparatus of claim 11, wherein the type information comprises at least one of: information as to whether relevant data is user data or control data, and information regarding a type of control data.

14. The apparatus of claim 13, wherein the dual mode controller inside the host modem is further configured to determine a modem in an activation state as the destination of the received data when the received data is user data, and determine a modem that processes control data of a relevant type as the destination of the received data depending on the type of control data when the received data is control data.

15. The apparatus of claim 14, wherein the dual mode controller inside the host modem is further configured to:
measure strength of a reception signal received via the host modem;
determine whether a reception signal strength value obtained through the reception signal strength measurement by the host modem is greater than a threshold;
when the reception signal strength value obtained through the reception signal strength measurement by the host modem is greater than the threshold, set the host modem to an activation state, and set the slave modem to a sleep state;
when the reception signal strength value obtained through the reception signal strength measurement by the host modem is not greater than the threshold, measure strength of a reception signal received via the slave modem;
determine whether a reception signal strength value obtained through the reception signal strength measurement by the slave modem is greater than the threshold;
when the reception signal value obtained through the reception signal strength measurement by the slave modem is greater than the threshold, set the slave modem to an activation state, and set the host modem to a sleep state; and
when the reception signal strength value obtained through the reception signal strength measurement by the slave modem is not greater than the threshold, maintain a state to which the host modem and the slave modem are currently set.

16. The apparatus of claim 14, wherein the dual mode controller inside the host modem is further configured to:
measure strength of a reception signal received via the host modem;
determine whether a reception signal strength value obtained through the reception signal strength measurement by the host modem is greater than a threshold;
when the reception signal strength value obtained through the reception signal strength measurement by the host modem is greater than the threshold, set the host modem to an activation state, and set the slave modem to a sleep state; and
when the reception signal strength value obtained through the reception signal strength measurement by the host modem is not greater than the threshold, measure strength of a reception signal received via the slave modem.

17. The apparatus of claim 14, wherein the dual mode controller inside the host modem is further configured to:
measure strength of a reception signal received via the slave modem;
determine whether a reception signal strength value obtained through the reception signal strength measurement by the slave modem is greater than the threshold;
when the reception signal value obtained through the reception signal strength measurement by the slave modem is greater than the threshold, set the slave modem to an activation state, and set the host modem to a sleep state; and
when the reception signal strength value obtained through the reception signal strength measurement by the slave modem is not greater than the threshold, maintain a state to which the host modem and the slave modem are currently set.

18. An apparatus for transmitting data in a dual mode terminal having a host modem and a slave modem, the slave modem configured to generate data, the apparatus comprising:
a connection memory inside the host modem configured to receive the generated data from the slave modem; and
a dual mode controller inside the host modem configured to determine a destination of the received data and forward the received data to the determined destination, wherein the dual mode controller is configured to determine the destination of the received data depending on a type information of the received data,
wherein the slave modem is configured to transmit the generated data via the host modem to an external apparatus when the determined destination is the external apparatus.

19. The apparatus of claim 18, wherein the dual mode controller inside the host modem is further configured to extract type information from the received data, and
wherein the type information comprises at least one of: information as to whether relevant data is user data or control data, and information regarding a type of control data.

20. The apparatus of claim 19, wherein the dual mode controller inside the host modem is further configured to determine the external apparatus as the destination of the received data when the received data is user data, and determine the external apparatus or a modem that processes control data of a relevant type as the destination of the received data depending on the type of control data when the received data is control data.

* * * * *